US008606289B2

(12) United States Patent
Gaal

(10) Patent No.: US 8,606,289 B2

(45) Date of Patent: Dec. 10, 2013

(54) POWER HEADROOM-SENSITIVE SCHEDULING

(75) Inventor: Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 12/615,217

(22) Filed: Nov. 9, 2009

(65) Prior Publication Data

US 2010/0120446 A1 May 13, 2010

Related U.S. Application Data

(60) Provisional application No. 61/112,936, filed on Nov. 10, 2008.

(51) Int. Cl.
*H04W 72/00* (2009.01)
*H04B 15/00* (2006.01)
*H04B 1/10* (2006.01)

(52) U.S. Cl.
USPC .................... 455/452.2; 455/450; 455/452.1; 455/63.1; 455/114.2; 455/296; 370/278

(58) Field of Classification Search
USPC .................. 455/69, 450–452.2; 370/329, 437
See application file for complete search history.

(56) References Cited

U.S. PATENT DOCUMENTS 7,773,679 B2 8/2010 Laroia et al.
2003/0228870 A1 12/2003 Ishiguro
2004/0106412 A1* 6/2004 Laroia et al. .................. 455/448
2004/0116143 A1* 6/2004 Love et al. .................... 455/522
2004/0147276 A1* 7/2004 Gholmieh et al. ............ 455/522
2007/0140168 A1 6/2007 Laroia et al.
2007/0286156 A1* 12/2007 Gormley et al. .............. 370/350
2008/0032671 A1* 2/2008 Karabinis .................. 455/412.1
2008/0039133 A1* 2/2008 Ma et al. .................... 455/552.1
2008/0108369 A1* 5/2008 Visotsky et al. .............. 455/455

(Continued)

FOREIGN PATENT DOCUMENTS

CN 1708923 A 12/2005
CN 1953364 A 4/2007

(Continued)

OTHER PUBLICATIONS

Duplexers for Cellular Phones, Oct. 12, 2007, Epcos, p. 3, located at http://www.epcos.com/inf/40/ds/mc/B7647.pdf.*

(Continued)

*Primary Examiner* — Gennadiy Tsvey
(74) *Attorney, Agent, or Firm* — Nerrie M. Zohn

(57) ABSTRACT

User equipment reports periodically or aperiodically serving cell reference signal received power and quality as well as uplink power headroom information to the serving evolved NodeB (eNB). eNB calculates a current interference level experienced by the UE from the feedback report and its own loading. Since the self-interference is not flat across frequencies, the tolerable self-interference level depends on downlink scheduling. From the calculated interference, eNB can calculate uplink allocation parameters. Sequence of scheduling decisions can be downlink allocation, determining tolerable self-interference, and uplink allocation, or in the opposite order, or the downlink and uplink allocation can be jointly determined using the available. An additional scheduling constraint can be derived for meeting the co-existence requirements, which can be determined from the power headroom report alone. Thereby interference to other user equipment or self-interference (self-desensitization) is addressed when inadequate attenuation exists while also allowing deploying full system bandwidth.

56 Claims, 10 Drawing Sheets

100
RADIO ACCESS NETWORK (RAN) 102
SCHEDULER 104
Serving Node (Macro eNB) 106
TX 112 | RX 118
COMPUTING PLATFORM 148
FEEDBACK 146
DL GRANT/ ASSIGNMENT 120
UL GRANT 128
UL GRANT (Δt, f) 150
UL GRANT 134
FEEDBACK 146
User Equipment (UE) 108
TX 130 | RX 122
COMPUTING PLATFORM 142
User Equipment (UE) 110
RX 136 | TX 138
COMPUTING PLATFORM 144
114 116 132 140 124 126

(56) References Cited

U.S. PATENT DOCUMENTS

| | | | | |
|---|---|---|---|---|
| 2008/0214197 | A1* | 9/2008 | Englund et al. | 455/450 |
| 2009/0073958 | A1* | 3/2009 | Xu | 370/352 |
| 2009/0110087 | A1* | 4/2009 | Liu et al. | 375/260 |
| 2009/0135748 | A1* | 5/2009 | Lindoff et al. | 370/296 |
| 2009/0213765 | A1* | 8/2009 | Rinne et al. | 370/278 |
| 2010/0035562 | A1* | 2/2010 | Alberth et al. | 455/75 |

FOREIGN PATENT DOCUMENTS

| | | | |
|---|---|---|---|
| CN | 101222376 | A | 7/2008 |
| JP | 2004015333 | A | 1/2004 |
| JP | 2004349872 | A | 12/2004 |
| JP | 2005525742 | A | 8/2005 |
| JP | 2009500961 | A | 1/2009 |
| WO | 2006106378 | A1 | 10/2006 |
| WO | WO 2006106378 | A1 * | 10/2006 |
| WO | 07096683 | | 8/2007 |
| WO | WO2007096683 | | 8/2007 |

OTHER PUBLICATIONS

Skyworks power amplifiers, Skyworks, retrieved on Jun. 27, 2012, located at http://www.skyworksinc.com/Products.aspx?CategoryID=105.*

Ericsson: “Band 13: spurious emission and sensitivity” 3GPP Draft; R4-081954, SRD Generation Partnership Project (3GPP), Mobile Competence Centre ; 650, Route Des Lucioles ; F-06921 Sophia-Antipolis Cedex ; France, vol. RAN WG4, No. Jeju; Aug. 26, 2008, XP050180463 [retrieved on Aug. 26, 2008] p. 1, paragraph 1—p. 2, paragraph 2 p. 4, paragraph 2.3.

Motorola: “Adjacent Channel UL/DL Co- © xi stGnc ©” 3GPP Draft; R4-082027_Adjacent Channel_Co-Existance, SRD Generation Partnership Project (3GPP), Mobile Competence Centre ; 650, Route Des Lucioles ; F-06921 Sophia-Antipolis Cedex ; France, vol. RAN WG4, No. Jeju; Aug. 14, 2008, XP050180524 [retrieved on Aug. 14, 2008] p. 2—paragraph 2.2 p. 3, paragraph 3—p. 4—paragraph 4.3.

Motorola: “PUCCH options address UL/DL co-existence” 3GPP Draft; R4-082561_ Pucch Option to address Co-existence, 3rd Generation Partnership Project (3GPP), Mobile Competence Centre ; 650, Route Des Lucioles ; F-06921 Sophia-Antipolis Cedex ; France, No. Scotland; Sep. 26, 2008, XP050325812 [retrieved on Sep. 26, 2008] p. 2, line 1—line 2 p. 2, line 26—line 28 p. 2, paragraph 2.3 p. 2, paragraph 2.4; figures 2.4-1 p. 3, paragraph 3.2 p. 4, paragraph 4.1.2—p. 5.

3GPP TS 36.101 V8.3.0 (Sep. 2008), 3rd Generation Partnership Project; Technical Specification Group Radio Access Network; Evolved Universal Terrestrial Radio Access (E-UTRA); User Equipment (UE) radio transmission and reception (Release 8).

Ericsson: “Band 13: spurious emission and sensitivity” 3GPP Draft; R4-081954, SRD Generation Partnership Project (3GPP), Mobile Competence Centre; 650, Route des Lucioles; F-06921 Sophia-Antipolis Cedex; France, vol. RAN WG4, No. Jeju; Aug. 26, 2008, XP050180463 [retrieved on Aug. 26, 2008] p. 1, paragraph 1—p. 2, paragraph 2 p. 4, paragraph 2.3.

International Search Report & Written Opinion—PCT/US2009/063844, International Search Authority—European Patent Office—Mar. 1, 2010.

Motorola: “Adjacent Channel UL/DL Co-©xi stGnc©” 3GPP Draft; R4-082027_Adjacent Channel_Co-Existence, SRD Generation Partnership Project (3GPP), Mobile Competence Centre; 650, Route des Lucioles; F-06921 Sophia-Antipolis Cedex; France, vol. RAN WG4, No. Jeju; Aug. 14, 2008, XP050180524 [retrieved on Aug. 14, 2008] p. 2—paragraph 2.2 p. 3, paragraph 3—p. 4 p. 4—paragraph 4.3.

Motorola: “LTE UE Minimum Transmission Bandwidth”, 3GPP TSG-RAN WG1#48 R1-070757, 3GPP, Feb. 16, 2007, R1-070757.

Motorola: “PUCCH options to address UL/DL co-existence” 3GPP Draft; R4-082561_PUCCH Option to Address Co-Existance, 3rd Generation Partnership Project (3GPP), Mobile Competence Centre; 650, Route des Lucioles; F06921 Sophia-Antipolis Cedex; France, No. Scotland; Sep. 26, 2008, XP050325812 [retrieved on Sep. 26, 2008] p. 2, line 1-line 2 p. 2, line 26-line 28 p. 2, paragraph 2.3 p. 2, paragraph 2.4; figures 2.4-1 p. 3, paragraph 3.2 p. 4, paragraph 4.1.2—p. 5.

Skyworks power amplifiers, Skyworks, retrieved on Jun. 27, 2012, located at http://www.skyworksinc.com/Products.aspx?CategoryID=105.

Taiwan Search Report—TW098138183—TIPO—Dec. 10, 2012.

* cited by examiner

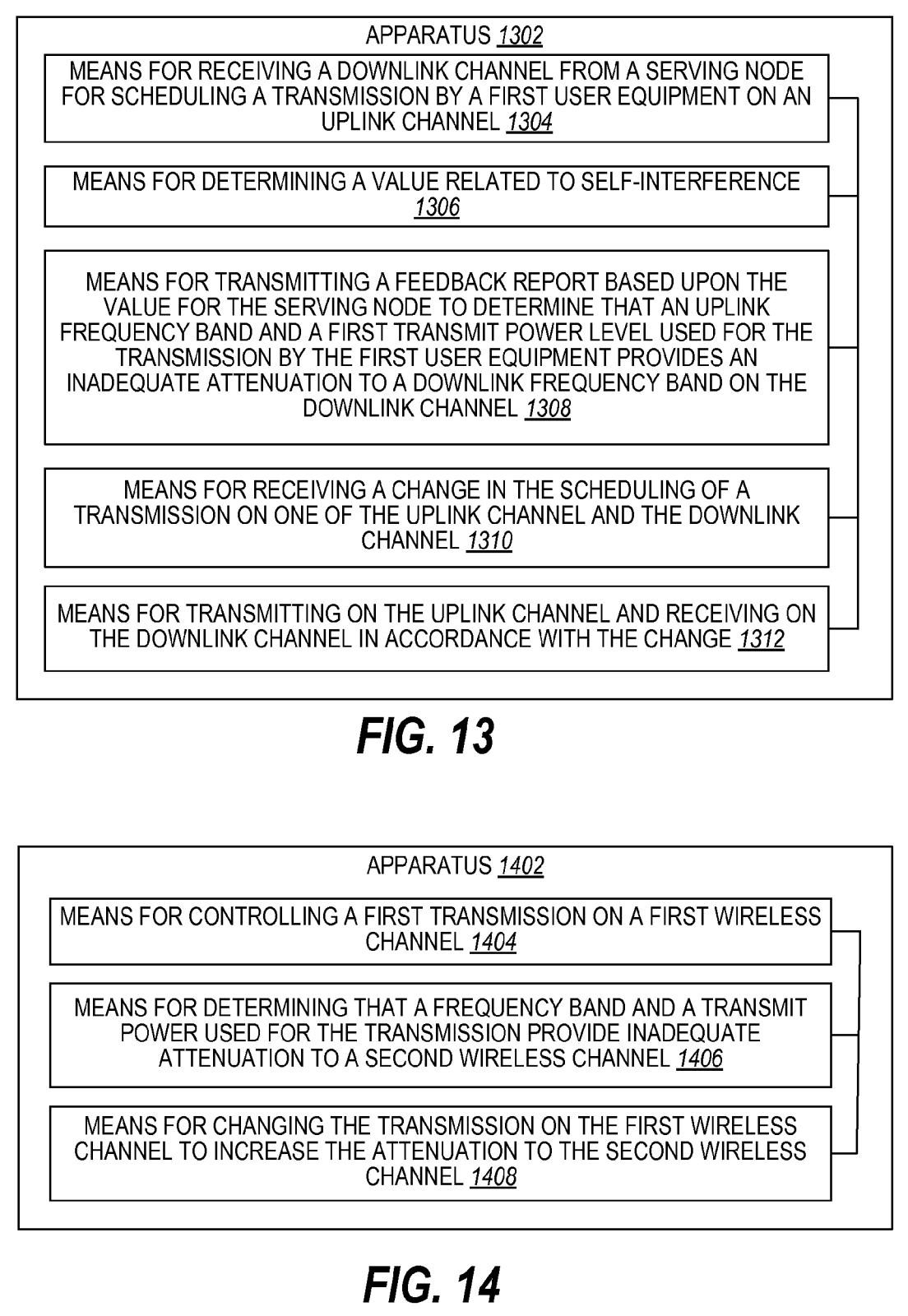

APPARATUS 1302

MEANS FOR RECEIVING A DOWNLINK CHANNEL FROM A SERVING NODE FOR SCHEDULING A TRANSMISSION BY A FIRST USER EQUIPMENT ON AN UPLINK CHANNEL 1304

MEANS FOR DETERMINING A VALUE RELATED TO SELF-INTERFERENCE 1306

MEANS FOR TRANSMITTING A FEEDBACK REPORT BASED UPON THE VALUE FOR THE SERVING NODE TO DETERMINE THAT AN UPLINK FREQUENCY BAND AND A FIRST TRANSMIT POWER LEVEL USED FOR THE TRANSMISSION BY THE FIRST USER EQUIPMENT PROVIDES AN INADEQUATE ATTENUATION TO A DOWNLINK FREQUENCY BAND ON THE DOWNLINK CHANNEL 1308

MEANS FOR RECEIVING A CHANGE IN THE SCHEDULING OF A TRANSMISSION ON ONE OF THE UPLINK CHANNEL AND THE DOWNLINK CHANNEL 1310

MEANS FOR TRANSMITTING ON THE UPLINK CHANNEL AND RECEIVING ON THE DOWNLINK CHANNEL IN ACCORDANCE WITH THE CHANGE 1312

*FIG. 13*

APPARATUS 1402

MEANS FOR CONTROLLING A FIRST TRANSMISSION ON A FIRST WIRELESS CHANNEL 1404

MEANS FOR DETERMINING THAT A FREQUENCY BAND AND A TRANSMIT POWER USED FOR THE TRANSMISSION PROVIDE INADEQUATE ATTENUATION TO A SECOND WIRELESS CHANNEL 1406

MEANS FOR CHANGING THE TRANSMISSION ON THE FIRST WIRELESS CHANNEL TO INCREASE THE ATTENUATION TO THE SECOND WIRELESS CHANNEL 1408

*FIG. 14*

POWER HEADROOM-SENSITIVE SCHEDULING

CLAIM OF PRIORITY UNDER 35 U.S.C. §119

The present Application for Patent claims priority to Provisional Application No. 61/112,936 entitled "Power Headroom-Sensitive Scheduling" filed Nov. 10, 2008, and assigned to the assignee hereof and hereby expressly incorporated by reference herein.

BACKGROUND

1. Field

The present disclosure relates generally to communication, and more specifically for mitigating insufficient attenuation in a wireless communication network.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Over-the-air resources are thus used in a manner where orthogonality in time, frequency, and coding seek to minimize interference. In certain frequency band allocations and loading conditions, wireless transmitting/receiving units can be required to transmit and receive channels that are too close to provide an adequate attenuation. In an attempt to address this situation, it has been proposed to limit system bandwidth to provide for co-existence and avoid self-desensitization. However, such limits introduce inefficiencies because of increased overhead and reduced scheduling gains associated to operating independent carriers instead of a wider band allocation.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for mitigating inadequate attenuation for co-existence between channels by employing a processor executing computer executable instructions stored on a computer readable storage medium to implement following acts: scheduling via a downlink channel a transmission by a first user equipment on an uplink channel; determining that an uplink frequency band and a first transmit power level used for the transmission by the first user equipment provides an inadequate attenuation to a downlink frequency band on the downlink channel; and changing the scheduling of the transmission on one of the uplink channel and the downlink channel to provide an adequate attenuation to the downlink frequency band.

In another aspect, a computer program product is provided for mitigating inadequate attenuation for co-existence between channels. At least one computer readable storage medium stores computer executable instructions that, when executed by at least one processor, implement components: A first set of codes schedules via a downlink channel a transmission by a first user equipment on an uplink channel. A second set of codes determines that an uplink frequency band and a first transmit power level used for the transmission by the first user equipment provides an inadequate attenuation to a downlink frequency band on the downlink channel. A third set of codes changes the scheduling of the transmission on one of the uplink channel and the downlink channel to provide an adequate attenuation to the downlink frequency band.

In an additional aspect, an apparatus is provided for mitigating inadequate attenuation for co-existence between channels, the apparatus. At least one computer readable storage medium stores computer executable instructions that, when executed by the at least one processor, implement components: Means are provided for scheduling via a downlink channel a transmission by a first user equipment on an uplink channel. Means are provided for determining that an uplink frequency band and a first transmit power level used for the transmission by the first user equipment provides an inadequate attenuation to a downlink frequency band on the downlink channel. Means are provided for changing the scheduling of the transmission on one of the uplink channel and the downlink channel to provide an adequate attenuation to the downlink frequency band.

In another additional aspect, an apparatus is provided for mitigating inadequate attenuation for co-existence between channels. A scheduler schedules via a transmitter on a downlink channel a transmission by a first user equipment received by the receiver on an uplink channel. A computing platform determines that an uplink frequency band and a first transmit power level used for the transmission by the first user equipment provides an inadequate attenuation to a downlink frequency band on the downlink channel, and changes the scheduling of the transmission on one of the uplink channel and the downlink channel to provide an adequate attenuation to the downlink frequency band.

In a further aspect, a method is provided for mitigating inadequate attenuation for co-existence between channels by employing a processor executing computer executable instructions stored on a computer readable storage medium to implement following acts: A downlink channel is received from a serving node for scheduling a transmission by a first user equipment on an uplink channel. A value is determined related to self-interference. A feedback report is transmitted based upon the value for the serving node to determine that an uplink frequency band and a first transmit power level used for the transmission by the first user equipment provides an inadequate attenuation to a downlink frequency band on the downlink channel. A change in the scheduling of the transmission on one of the uplink channel and the downlink channel. The uplink channel is transmitted and the downlink channel is received in accordance with the change.

In yet one aspect, a computer program product is provided for mitigating inadequate attenuation for co-existence between channels. At least one computer readable storage medium stores computer executable instructions that, when executed by at least one processor, implement components: A first set of codes receives a downlink channel from a serving node for scheduling a transmission by a first user equipment on an uplink channel. A second set of codes determines a value related to self-interference. A third set of codes transmits a feedback report based upon the value for the serving node to determine that an uplink frequency band and a first transmit power level used for the transmission by the first user equipment provides an inadequate attenuation to a downlink frequency band on the downlink channel. A fourth set of codes receives a change in the scheduling of the transmission on one of the uplink channel and the downlink channel to provide an adequate attenuation to the downlink frequency band. A fifth set of codes transmits on the uplink channel and receives on the downlink channel in accordance with the change.

In yet another aspect, an apparatus is provided for mitigating inadequate attenuation for co-existence between channels. At least one computer readable storage medium stores computer executable instructions that, when executed by the at least one processor, implement components: Means are provided for receiving a downlink channel from a serving node for scheduling a transmission by a first user equipment on an uplink channel. Means are provided for determining a value related to self-interference. Means are provided for transmitting a feedback report based upon the value for the serving node to determine that an uplink frequency band and a first transmit power level used for the transmission by the first user equipment provides an inadequate attenuation to a downlink frequency band on the downlink channel. Means are provided for receiving a change the scheduling of the transmission on one of the uplink channel and downlink channel to provide an adequate attenuation to the downlink frequency band. Means are provided for transmitting on the uplink channel and receiving on the downlink channel in accordance with the change.

In yet an additional aspect, an apparatus is provided for mitigating inadequate attenuation for co-existence between channels. A receiver receives a downlink channel from a serving node for scheduling a transmission by a first user equipment on an uplink channel. A computing platform determines a value related to self-interference. A transmitter transmits a feedback report based upon the value for the serving node to determine that an uplink frequency band and a first transmit power level used for the transmission by the first user equipment provides an inadequate attenuation to a downlink frequency band on the downlink channel. The receiver receives a change in the scheduling of the transmission on one of the uplink channel and the downlink channel to provide an adequate attenuation to the downlink frequency band. The transmitter transmits on the uplink channel and the receiver receives on the downlink channel in accordance with the change.

In yet another additional aspect, a method is provided for mitigating inadequate attenuation for co-existence between channels by employing a processor executing computer executable instructions stored on a computer readable storage medium to implement following acts: A first transmission is controlled on a first wireless channel. It is determined that a frequency band and a transmit power used for the transmission provides an inadequate attenuation to a second wireless channel. The transmission on the first wireless channel is changed to increase the attenuation to the second wireless channel.

In yet a further aspect, a computer program product is provided for mitigating inadequate attenuation for co-existence between channels. At least one computer readable storage medium stores computer executable instructions that, when executed by at least one processor, implement components: A first set of codes controls a first transmission on a first wireless channel. A second set of codes determines that a frequency band and a transmit power used for the transmission provide inadequate attenuation to a second wireless channel. A third set of codes changes the transmission on the first wireless channel to increase the attenuation to the second wireless channel.

In one aspect, an apparatus is provided for mitigating inadequate attenuation for co-existence between channels. At least one computer readable storage medium stores computer executable instructions that, when executed by the at least one processor, implement components: Means are provided for controlling a first transmission on a first wireless channel. Means are provided for determining that a frequency band and a transmit power used for the transmission provide inadequate attenuation to a second wireless channel. Means are provided for changing the transmission on the first wireless channel to increase the attenuation to the second wireless channel.

In another aspect, an apparatus is provided for mitigating inadequate attenuation for co-existence between channels. A transmitter controls a first transmission on a first wireless channel. A computing platform determines that a frequency band and a transmit power used for the transmission provide inadequate attenuation to a second wireless channel. The transmitter changes the transmission on the first wireless channel to increase the attenuation to the second wireless channel.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 13 illustrates a block diagram of an apparatus having means for user equipment to mitigate inadequate attenuation.

FIG. 14 illustrates a block diagram of an apparatus having means for mitigating inadequate attenuation.

DETAILED DESCRIPTION

User equipment (UE) reports periodically or aperiodically (e.g., event triggered) serving cell reference signal received power and quality as well as uplink power headroom information to the serving evolved NodeB (eNB). The eNB calculates a current interference level experienced by the UE from the feedback report and its own loading. Since the self-interference is not flat across frequencies, the tolerable self-interference level depends on downlink scheduling. From the calculated interference, the eNB can calculate uplink allocation parameters. Sequence of scheduling decisions can be downlink allocation, determining tolerable self-interference, and uplink allocation, or in the opposite order, or the downlink and uplink allocation can be jointly determined. An additional scheduling constraint can be derived for meeting the co-existence requirements, which can be determined from the power headroom report alone. Thereby interference to other user equipment or self-interference (self-desensitization) is addressed when inadequate attenuation exists while also allowing deploying full system bandwidth. It should be appreciate that the present innovation applies to adjacent channel Time Division Duplex (TDD) coexistence even without frequency duplex. Further the present innovation has applications to scheduling either or both an uplink and a downlink to achieve greater attenuation.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
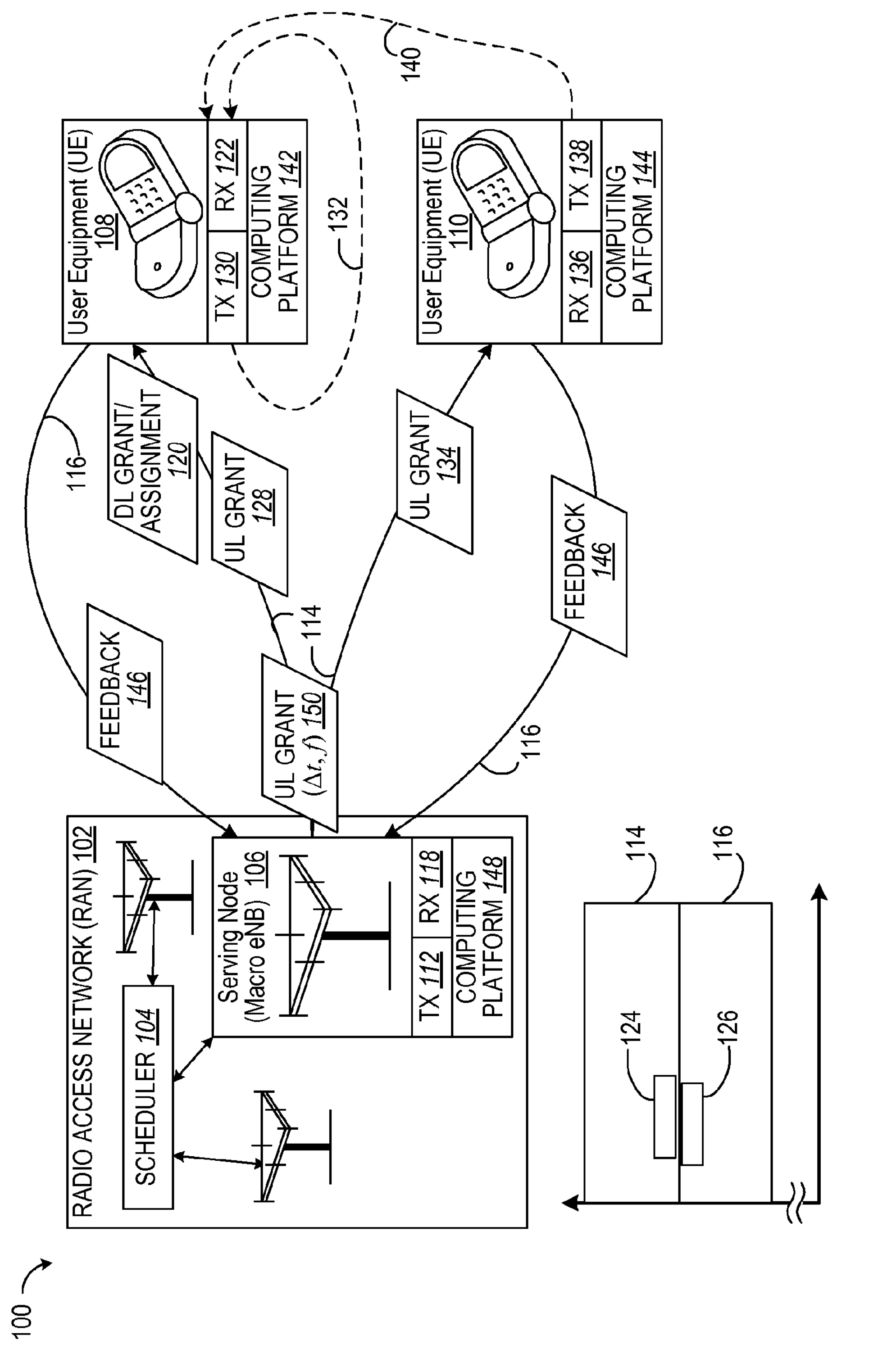
FIG. 1 illustrates a block diagram for a radio access network and user equipment that mitigates inadequate attenuation.

In FIG. 1, a wireless communication system 100 provides high speed packet access between a Radio Access Network (RAN) 102, which is depicted as a scheduler 104 and an evolved NodeB (eNB) 106, and first and second UEs 108, 110. In an exemplary aspect, the scheduler 104 via a transmitter (Tx) 112 of the serving eNB 106 has scheduled the first and second UEs 108, 110 via a Downlink (DL) channel 114 to use frequency resources on an Uplink (UL) channel 116 that is received by a receiver (Rx) 118 of the eNB 106. The uplink frequency resources are close in frequency to a portion of the Downlink (DL) channel 114 used by the eNB 106 for this scheduling such that inadequate attenuation is provided for at least one of the UEs 108, 110.

In one aspect, the inadequate attenuation means causing self-interference, which causes self-desensitization. For instance, a first downlink grant or assignment 120 is received by a receiver 122 of the first UE 108. This first downlink grant or assignment 120 is for a DL frequency band 124 of the DL channel 114 that is close to an UL frequency band 126 of the UL channel 116. A first uplink grant 128 is given to the first UE 108 to make a transmission via a transmitter 130 on the UL channel 116 in this UL frequency band 126. Thus, the receiver 122 of the first UE 108 turned to the DL frequency band 124 is subject to interference (self-desensitization) 132 from the first UE 108.

In another aspect, the inadequate attenuation means causing interference to another wireless transmitter/receiver unit. For instance, a second uplink grant 134 for the UL frequency band 126 is received by a receiver 136 of the second UE 110. When the second UE 110 transmits using a transmitter 138, interference 140 is caused at the receiver 122 of the first UE 108.

In mitigation of the inadequate attenuation, each UE 108, 110 can utilize a respective computing platform 142, 144 that generate downlink channel feedback reports 146, transmitted either periodically or aperiodically (e.g., event triggered). The feedback reports 146 can pertain to a transmit power (e.g., headroom) used by the respective UE 108, 110. Alternatively or in addition, the feedback reports 146 can indicate downlink channel received strength from the eNB 106. Alternatively or in addition, the feedback reports 146 can indicate channel quality (e.g., power/location of interference signals received from other base stations).

The eNB 106 can utilize a computing platform 148 to determine that inadequate attenuation exists, such as based upon scheduling and estimates of characteristics of the UEs 108, 110. Alternatively or in addition, the eNB 106 can receive the feedback reports 146 to aid or to primarily be a basis for determining the inadequate attenuation. Based upon this determination, the eNB 106 can make changes in scheduling, depicted as sending another grant 150 with either a lower transmit power value or changed frequency band.

In an exemplary aspect, one problem when using broadband systems such as LTE is that some of the existing bands do not provide an adequate attenuation. There are two types of problems that can occur. For user equipment (UEs) that transmit at the Uplink (UL) channel closest to the Downlink (DL) band, the general −50 dBm/MHz coexistence requirements is not met. When the UE transmits at maximum power, the required attenuation is approximately 60-70 dB. Assuming a 35 dB-45 dB duplexer attenuation, in the worst case, a level of up to 35 dB noise attenuation is still required in order to meet the coexistence requirements. In order to achieve this, the duplex gap should be more than at least the UE transmission bandwidth. This condition may not be satisfied in all cases. The coexistence requirements apply to receive frequencies of other bands as well, and similarly, the frequency separation between the UL frequency and the receive frequency of any other band should be more than at least the UE transmission bandwidth. This condition may also not be satisfied in all cases.

The other type of problem is when the UE transmission causes self-desensitization. In order to avoid desensitization, the Transmit (Tx) leakage into the Receive (Rx) frequency should be no more than −105 dBm/MHz, preferably no more than −115 dBm/MHz. Again, assuming 35 dB duplexer attenuation, the Tx noise floor at the receive frequency should be around −70 dBm/MHz. In order to achieve this, the duplex separation should be at least five times the UE transmission bandwidth.

Both the coexistence problems or the self-desensitization can be caused by other sources of unwanted spurious products besides Tx spectral re-growth. A well known example is when transmission with a narrow band allocation intermodulates with the carrier leakage (LO leakage) or with the IQ-image. This will create $3^{rd}$ order, $5^{th}$ order or higher order intermodulation products that can be outside of the UL channel depending on the scheduled UL frequency allocation. Both LO leakage and IQ-image are artifacts created by imperfect modulators used in upconverting the baseband signal to RF frequencies. There are other effects creating spurious emissions at the same frequency locations. The location in frequency and the approximate power of these emissions can be estimated by the eNB if the eNB has information about the scheduled UL frequency and the Tx power.

Assuming broadband LTE frequency allocation (10 MHz, 15 MHz, 20 MHz), there will be operating bands where one or both problems described above will occur.

Figure 2:
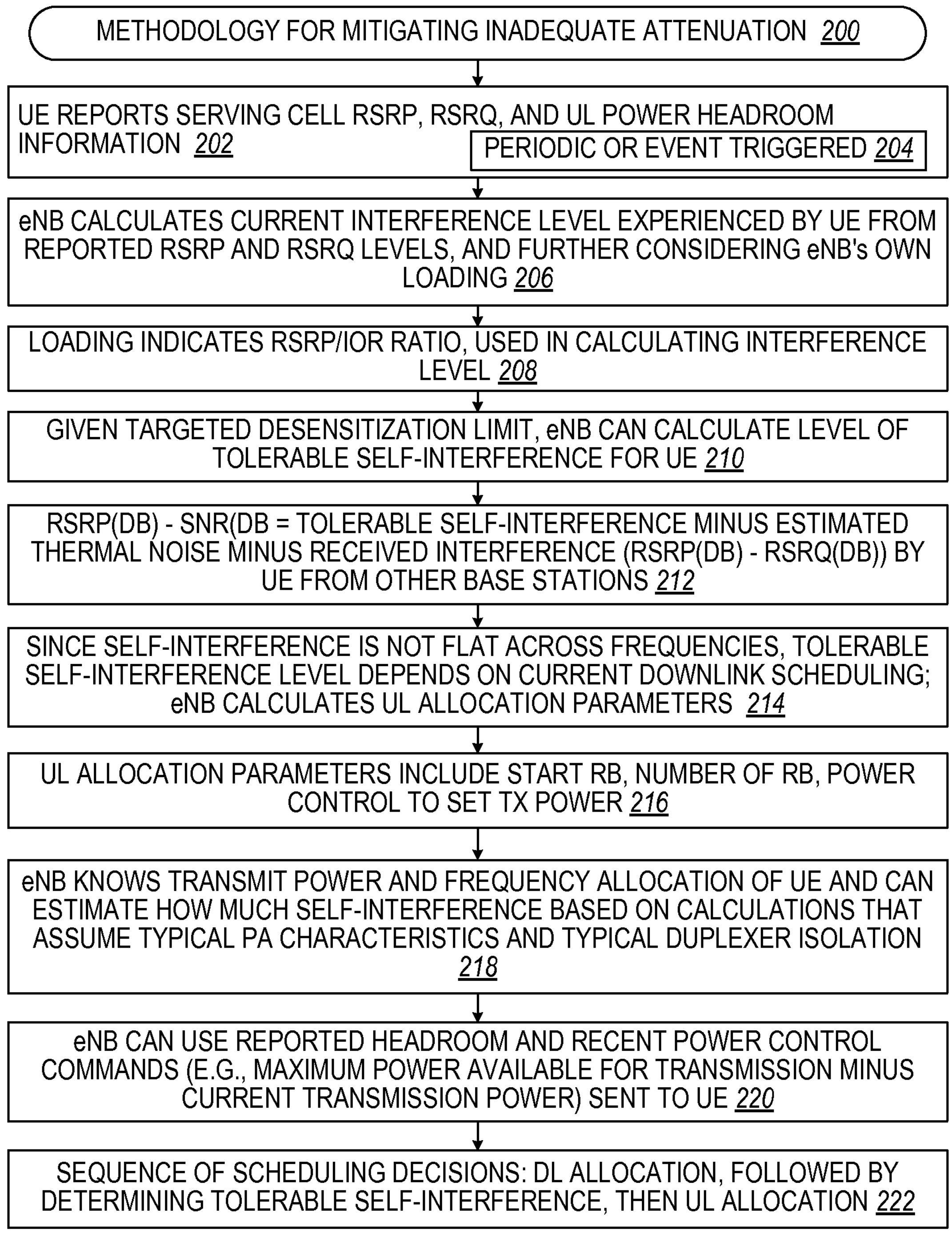
FIG. 2 illustrates a flow diagram of a methodology for mitigating inadequate attenuation in an exemplary broadband radio access network.

In an exemplary aspect depicted in FIG. 2, a methodology 200 is provided to alleviate the aforementioned problems, and in particular for mitigating inadequate attenuation. The UE reports serving cell RSRP (Reference Signal Received Power), RSRQ (Reference Signal Received Quality), and UL power headroom information to a serving eNB (evolved or EUTRAN NodeB) (block 202). The report can be periodic or event triggered, where the event is some parameters exceeding certain thresholds (block 204). The eNB can then calculate the current interference level experienced by the UE from the reported RSRP and RSRQ levels, and further considering the eNBs own loading (block 206). The loading factor L indicates RSRP/IOR ratio (in dB notation RSRP(dBm)-IOR (dBm)), which is used in calculating the interference level (block 208). Intra-cell received power (IOR) is generally regarded as the total received signal power in a time slot from the Base Station (BS) in which the Wireless Transmit/Receive Unit (WTRU) (e.g., UE) is communicating (as opposed to Inter-cell interference (IOC), generally defined as the sum of the total received signal power in a given time-slot from all the neighboring base stations). Intra-cell received power (IOR) is, therefore, the "useful" energy, or the signal from the BS with which a UE is communicating. Inter-cell interference is the interference caused by all the undesired signal energy from all the other Base Stations (BSs) received by a WTRU, and is therefore detrimental to the decoding of the "useful" signal. RSRQ is RSRP(dBm)-RSSI(dBm) where RSSI is the total received power (block 212)

It should be understood that while RSRP, RSRQ, Location (LOC), and IOC are used to determine as examples provided may use the above mentioned quantities to perform reselection ranking measurements, these quantities may be substituted by any other suitable signal power or signal quality measure without falling outside the intended scope of this disclosure. One skilled in the art with the benefit of the present disclosure would recognize that if any other measurements were used in the cell reselection process, the concepts disclosed herein would be equally applicable to such other measurements and thereby fall within the scope of this specification as well.

Assuming a targeted desensitization limit, the eNB can calculate level of tolerable self-interference for the UE (block 210). In one aspect, the tolerable total interference is RSRP (dBm)−SNR(dB) where SNR is the required SNR for demodulation. The tolerable self-interference is generally the total tolerable interference minus thermal noise minus received interference by the UE from other base stations. The thermal noise can be estimated by using a typical receiver noise figure. The received interference from other base stations, IOC, is $IOC=10\cdot\log_{10}(10^{RSRP(dBm)/10-RSRQ(dBm)/10}-10^{RSRP(dBm)/10-L/10})-N(dBm)$ where N(dBm) is the thermal noise floor, L=RSRP(dBm)−IOR(dBm), is the serving cell loading factor, which equals the transmit reference signal power to total eNB transmit power ratio in dB. The loading factor L is known to the eNB even without UE reports. Therefore, with the knowledge of RSRP, RSRQ, L, the target SNR and the receiver noise figure, the tolerable self-interference can be calculated. The definition of the parameters mentioned above may involve various scaling factors but those were omitted here for simplicity.

Since the self-interference is not flat across frequencies, the tolerable self-interference level will also depend on the current downlink scheduling. From the calculated interference, the eNB can calculate the UL allocation parameters (block 214). UL allocation parameters may include, for example in block 216:

Start Resource Block (RB), the lowest frequency of the set of allocated RBs;

Number of RB, the total number of RBs allocated to the UE (i.e., bandwidth); and Power control to set Tx power.

Since the eNB knows what transmit power and frequency allocation the UE will be using, it can estimate how much self-interference will be generated based on calculations that assume typical power amplifier (PA) characteristics and typical duplexer isolation (block 218). In this calculation, the eNB can use the reported headroom and the recent power control commands, if any, that was sent to the UE (block 220). The reported headroom is generally defined as the maximum power available for transmission minus the current transmission power. In one aspect, the sequence of scheduling decisions may comprise DL allocation, followed by determining tolerable self-interference, then UL allocation (block 222).

In another aspect, this process is reversed. In yet another aspect, the DL and UL allocation can be jointly determined using the available information. An additional scheduling constraint can be derived for meeting the coexistence requirements. This can be determined from the power headroom report alone. The additional scheduling constraint, in one aspect, is defined as the base station further lowering the UE transmit power by using power control or schedules the uplink transmission in a more preferable location in the spectrum, beyond what would be required just to meet the self-interference target.

By virtue of the foregoing, in one aspect an apparatus is provided that is operable in wireless communication system. Means are provided for receiving an RSRP and an RSRQ from a UE. Means are provided for calculating a level of tolerable self-interference for the UE based on the RSRP and RSRQ. Means are provided for calculating an uplink parameter for the UE based on the calculated level of tolerable self-interference. Means are provided for transmitting the uplink parameter to the UE.

In another aspect, a method is provided for use in a wireless communication system by receiving an RSRP and an RSRQ from a UE, calculating a level of tolerable self-interference for the UE based on the RSRP and RSRQ, calculating an uplink parameter for the UE based on the calculated level of tolerable self-interference, and transmitting the uplink parameter to the UE. An electronic device can be configured to execute this method.

In an additional aspect, a machine-readable medium comprises instructions which, when executed by a machine, cause the machine to perform operations including: (a) receiving an RSRP and an RSRQ from a UE; (b) calculating a level of tolerable self-interference for the UE based on the RSRP and RSRQ; (c) calculating an uplink parameter for the UE based on the calculated level of tolerable self-interference; and (d) transmitting the uplink parameter to the UE.

In a further aspect, an apparatus is provided that is operable in a wireless communication system: A processor is configured for receiving an RSRP and an RSRQ from a UE, for calculating a level of tolerable self-interference for the UE based on the RSRP and RSRQ, for calculating an uplink parameter for the UE based on the calculated level of tolerable self-interference, and for transmitting the uplink parameter to the UE. A memory can be coupled to the processor for storing data.

In some aspects the teachings herein may be employed in a network that includes macro scale coverage (e.g., a large area cellular network such as a 3G (Third Generation) networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 3:
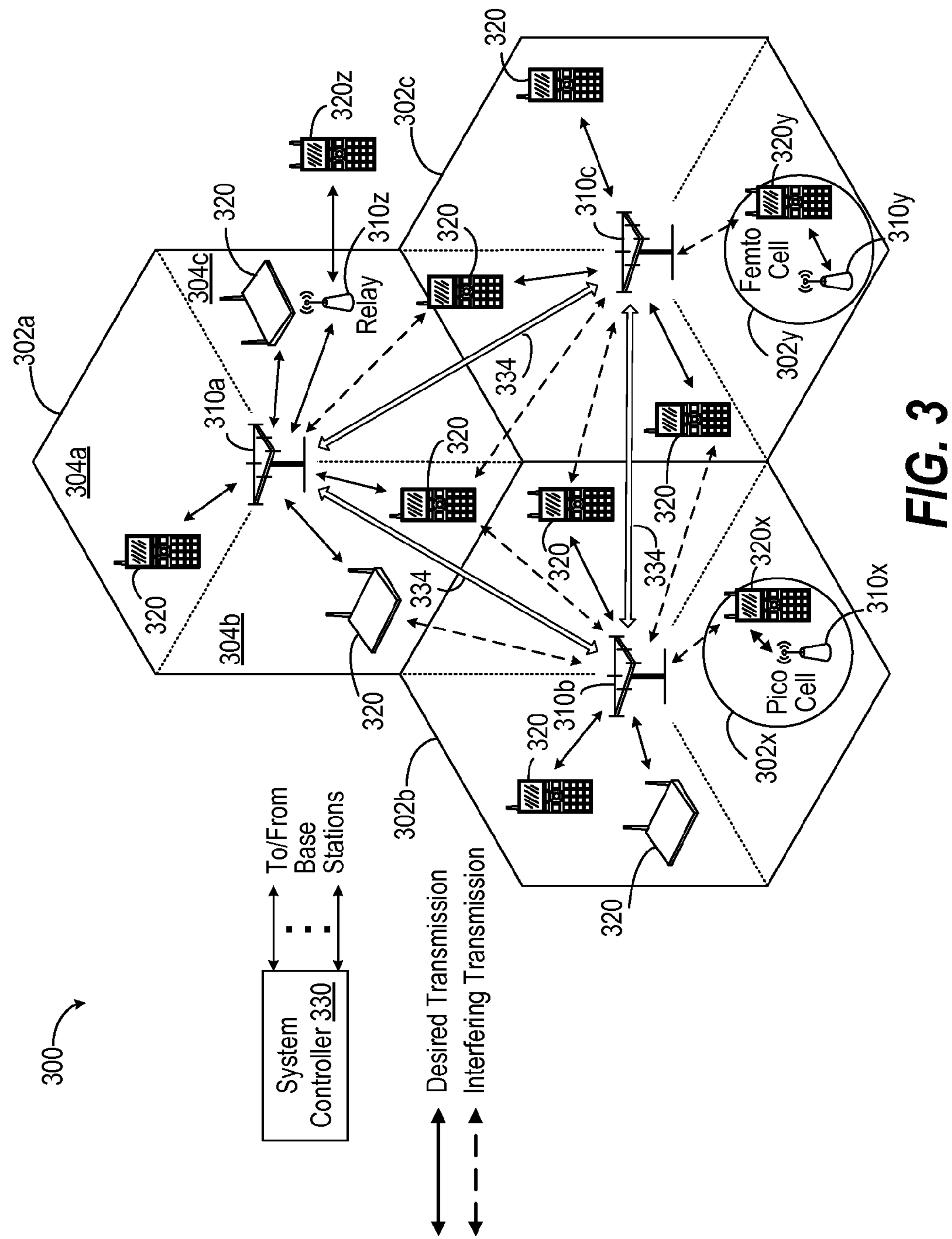
FIG. 3 illustrates a diagram of a wireless communication system comprising macro cells, femto cells and pico cells.

In the example shown in FIG. 3, base stations 310*a*, 310*b* and 310*c* may be macro base stations for macro cells 302*a*, 302*b* and 302*c*, respectively. Base station 310*x* may be a pico base station for a pico cell 302*x* communicating with terminal 320*x*. Base station 310*y* may be a femto base station for a femto cell 302*y* communicating with terminal 320*y*. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310*z* that communicates with terminal 320*z*. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310*a*-310*c* employing such a distributed architecture. Base stations 310*a*-310*c* may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 302*a*, 302*b*, or 302*c* corresponding to a respective base station 310*a*-310*c* can be partitioned into multiple smaller areas (e.g., areas 304*a*, 304*b*, and 304*c*). Each of the smaller areas 304*a*, 304*b*, and 304*c* can be served by a respective base transceiver subsystem (BTS, not shown). As used herein and generally in the art, the term "sector" can refer to a BTS and/or its coverage area depending on the context in which the term is used. In one example, sectors 304*a*, 304*b*, 304*c* in a cell 302*a*, 302*b*, 302*c* can be formed by groups of antennas (not shown) at base station 310, where each group of antennas is responsible for communication with terminals 320 in a portion of the cell 302*a*, 302*b*, or 302*c*. For example, a base station 310 serving cell 302*a* can have a first antenna group corresponding to sector 304*a*, a second antenna group corresponding to sector 304*b*, and a third antenna group corresponding to sector 304*c*. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal or user equipment. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 4:
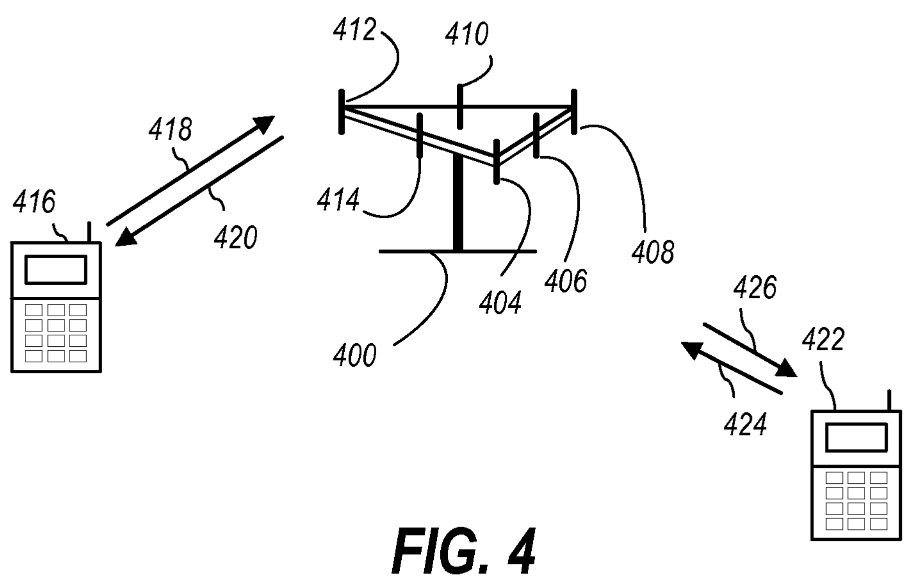
FIG. 4 illustrates a diagram of a multiple access wireless communication system.

Referring to FIG. 4, a multiple access wireless communication system according to one aspect is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequencies for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 5:
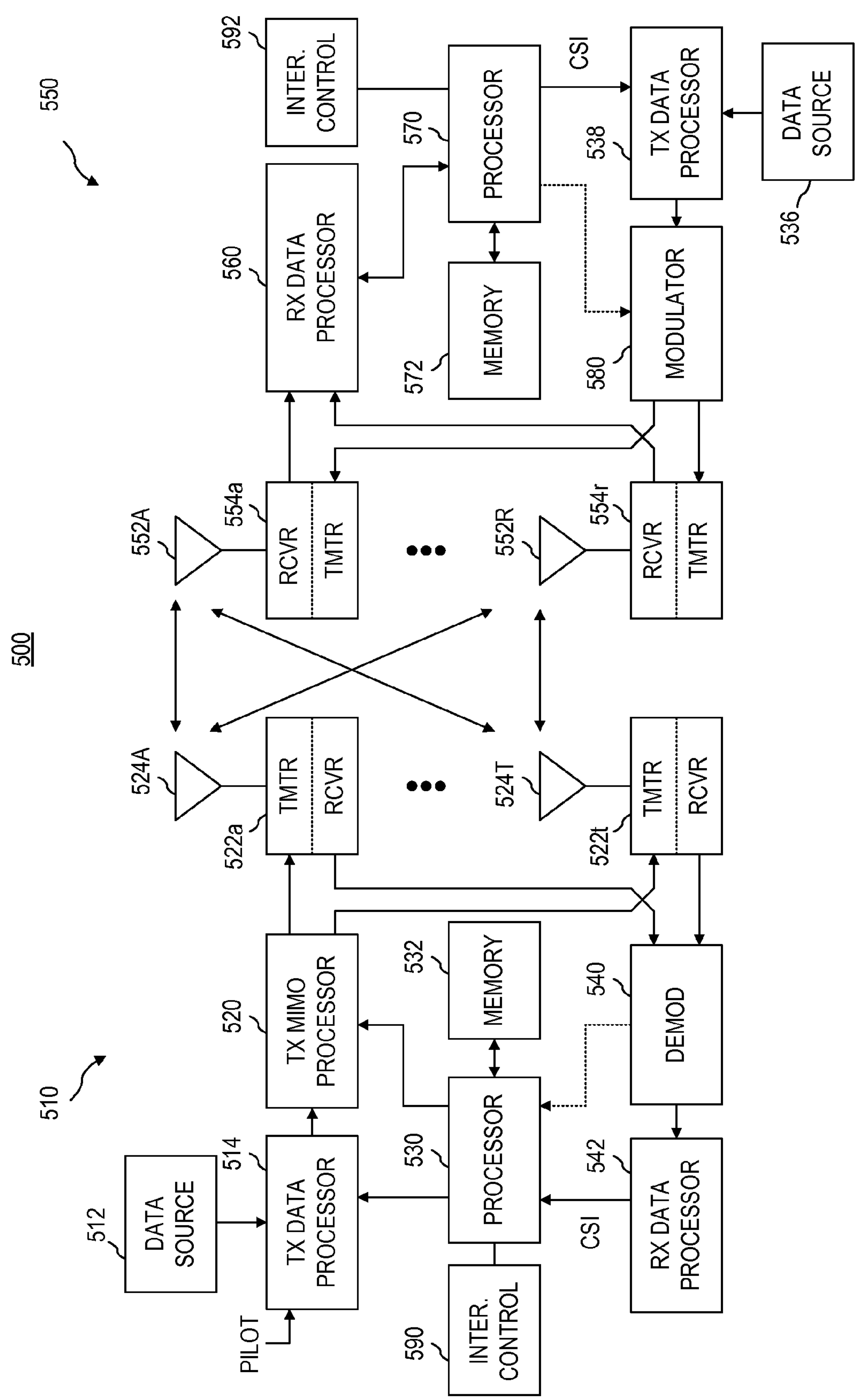
FIG. 5 illustrates a schematic of a multiple input multiple output (MIMO) communication system.

The teachings herein may be incorporated into a node (e.g., a device) employing various components for communicating with at least one other node. FIG. 5 depicts several sample components that may be employed to facilitate communication between nodes. Specifically, FIG. 5 illustrates a wireless device 510 (e.g., an access point) and a wireless device 550 (e.g., an access terminal) of a MIMO system 500. At the device 510, traffic data for a number of data streams is provided from a data source 512 to a transmit ("TX") data processor 514.

In some aspects, each data stream is transmitted over a respective transmit antenna. The TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A data memory 532 may store program code, data, and other information used by the processor 530 or other components of the device 510.

The modulation symbols for all data streams are then provided to a TX MIMO processor 520, which may further process the modulation symbols (e.g., for OFDM). The TX MIMO processor 520 then provides $N_T$ modulation symbol streams to $N_T$ transceivers ("XCVR") 522*a* through 522*t* that each has a transmitter (TMTR) and receiver (RCVR). In some aspects, the TX MIMO processor 520 applies beam-forming weights to the symbols of the data streams and to the antenna from which the symbol is being transmitted.

Each transceiver 522*a*-522*t* receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 522*a* through 522*t* are then transmitted from $N_T$ antennas 524*a* through 524*t*, respectively.

At the device 550, the transmitted modulated signals are received by $N_R$ antennas 552*a* through 552*r* and the received signal from each antenna 552*a*-552*r* is provided to a respective transceiver ("XCVR") 554*a* through 554*r*. Each transceiver 554*a*-554*r* conditions (e.g., filters, amplifies, and downconverts) a respective received signal, digitizes the conditioned signal to provide samples, and further processes the samples to provide a corresponding "received" symbol stream.

A receive ("RX") data processor 560 then receives and processes the $N_R$ received symbol streams from $N_R$ transceivers 554*a*-554*r* based on a particular receiver processing technique to provide $N_T$ "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the device 510.

A processor 570 periodically determines which pre-coding matrix to use. The processor 570 formulates a reverse link message comprising a matrix index portion and a rank value portion. A data memory 572 may store program code, data, and other information used by the processor 570 or other components of the device 550.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by the transceivers 554*a* through 554*r*, and transmitted back to the device 510.

At the device 510, the modulated signals from the device 550 are received by the antennas 524*a*-524*t*, conditioned by the transceivers 522*a*-522*t*, demodulated by a demodulator ("DEMOD") 540, and processed by a RX data processor 542 to extract the reverse link message transmitted by the device 550. The processor 530 then determines which pre-coding matrix to use for determining the beam-forming weights then processes the extracted message.

FIG. 5 also illustrates that the communication components may include one or more components that perform interference control operations. For example, an interference ("INTER.") control component 590 may cooperate with the processor 530 and/or other components of the device 510 to send/receive signals to/from another device (e.g., device 550). Similarly, an interference control component 592 may cooperate with the processor 570 and/or other components of the device 550 to send/receive signals to/from another device (e.g., device 510). It should be appreciated that for each device 510 and 550 the functionality of two or more of the described components may be provided by a single component. For example, a single processing component may provide the functionality of the interference control component 590 and the processor 530 and a single processing component may provide the functionality of the interference control component 592 and the processor 570.

Figure 6:
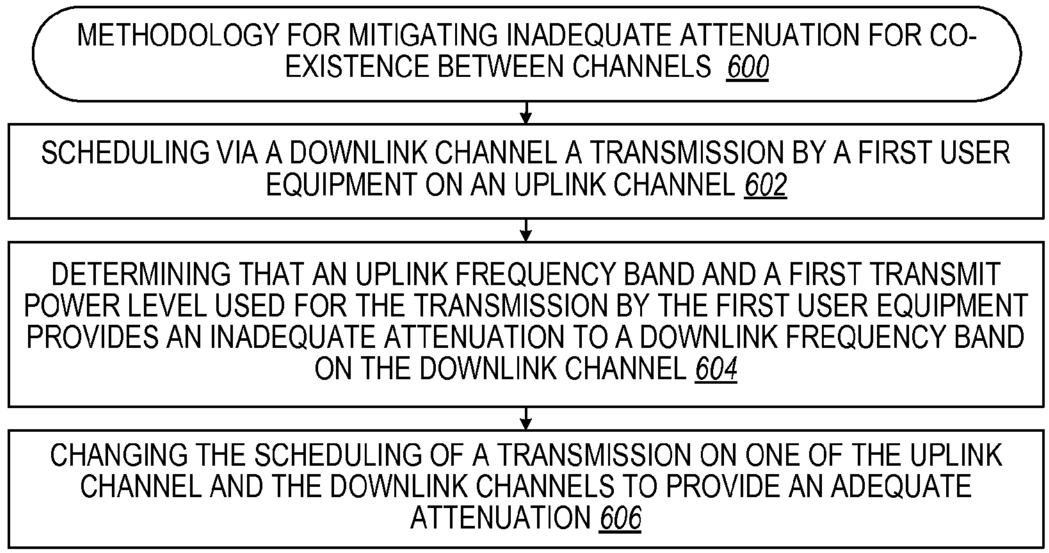
FIG. 6 illustrates a flow diagram of a methodology for a serving node to mitigate inadequate attenuation.

In FIG. 6, a methodology 600 is provided for mitigating inadequate attenuation for co-existence between channels by employing a processor executing computer executable instructions stored on a computer readable storage medium to implement following acts: An eNB schedules via a downlink channel of a transmission by a first user equipment on an uplink channel (block 602). The eNB determines that an uplink frequency band and a first transmit power level used for the transmission by the first user equipment provides an inadequate attenuation to a downlink frequency band on the downlink channel (block 604). The eNB changes the scheduling of the transmission on one of the uplink channel and the downlink channel to provide an adequate attenuation to the downlink frequency band (block 606).

Figure 7:
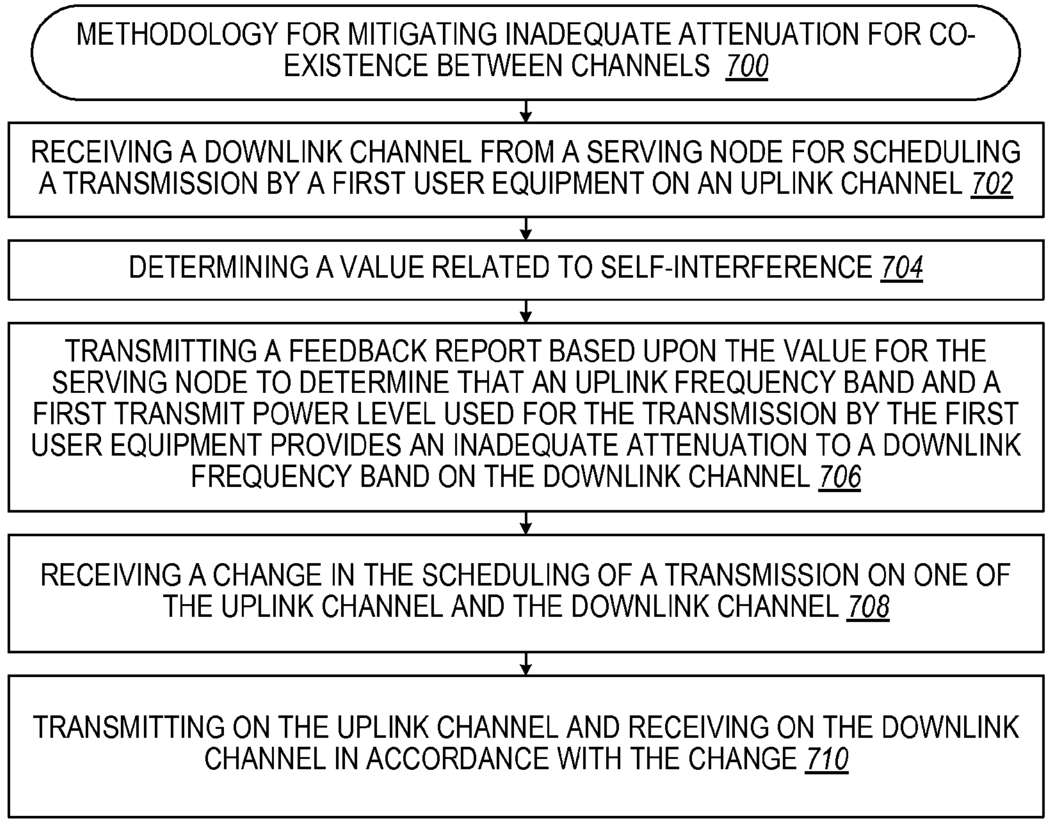
FIG. 7 illustrates a flow diagram of a methodology for user equipment to mitigate inadequate attenuation.

In FIG. 7, a methodology 700 is provided for mitigating inadequate attenuation for co-existence between channels by employing a processor executing computer executable instructions stored on a computer readable storage medium to implement following acts: A user equipment receives a downlink channel from a serving node for scheduling a transmission by a first user equipment on an uplink channel (block 702). The user equipment determines a value related to self-interference (block 704). The user equipment transmits a feedback report based upon the value for the serving node to determine that an uplink frequency band and a first transmit power level used for the transmission by the first user equipment provides an inadequate attenuation to a downlink frequency band on the downlink channel (block 706). The user equipment receives a change in the scheduling of the transmission on one of the uplink channel and the downlink channel to provide an adequate attenuation to the downlink frequency band (block 708). The user equipment transmits on the uplink channel and receives on the downlink channel in accordance with the change (block 710).

Figure 8:
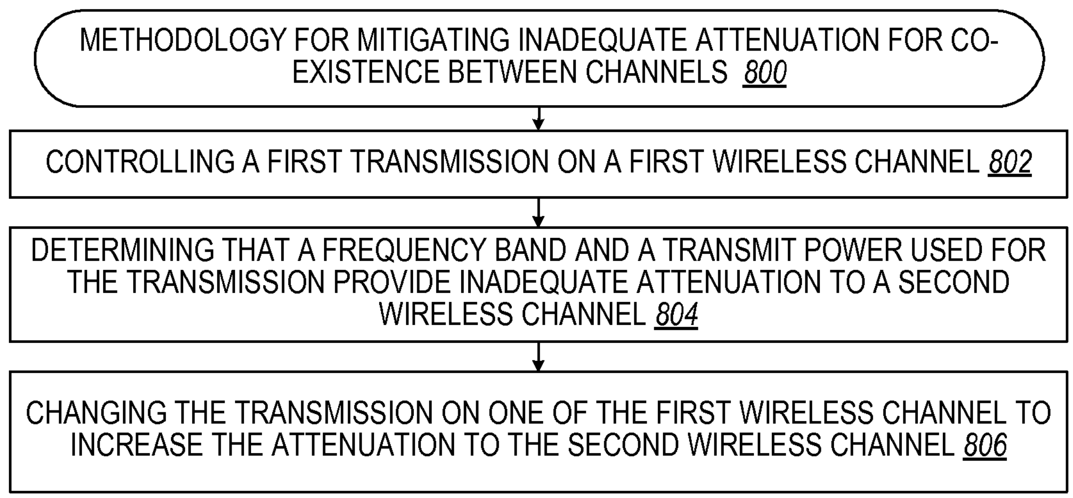
FIG. 8 illustrates a flow diagram of a methodology for mitigating inadequate attenuation.

In FIG. 8, a methodology 800 is provided for mitigating inadequate attenuation for co-existence between channels by employing a processor executing computer executable instructions stored on a computer readable storage medium to implement following acts: The methodology provides for controlling a first transmission on a first wireless channel (block 802), for determining that a frequency band and a transmit power used for the transmission provide inadequate attenuation to a second wireless channel (block 804), and for changing the transmission on the first wireless channel to increase the attenuation to the second wireless channel (block 806).

Figure 9:
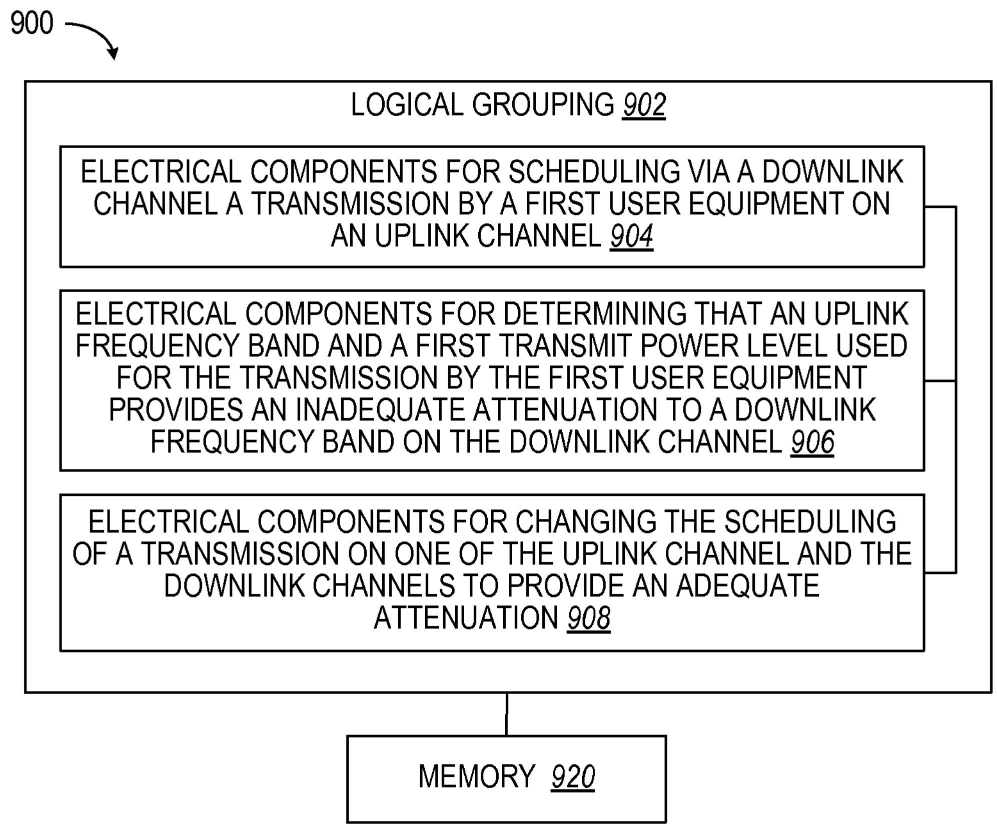
FIG. 9 illustrates a block diagram of a logical grouping of electrical components for mitigating inadequate attenuation that is incorporated at least in part in a node.

With reference to FIG. 9, illustrated is a system 900 for mitigating inadequate attenuation for co-existence between channels. For example, system 900 can reside at least partially within a network entity (e.g., evolved NodeB). It is to be appreciated that system 900 is represented as including functional blocks, which can be functional blocks that represent functions implemented by a computing platform, processor, software, or combination thereof (e.g., firmware). System 900 includes a logical grouping 902 of electrical components that can act in conjunction. For instance, logical grouping 902 can include an electrical component for scheduling via a downlink channel a transmission by a first user equipment on an uplink channel 904. Moreover, logical grouping 902 can include an electrical component for determining that an uplink frequency band and a first transmit power level used for the transmission by the first user equipment provides an inadequate attenuation to a downlink frequency band on the downlink channel 906. For another instance, logical grouping 902 can include an electrical component for changing the scheduling of the transmission on one of the uplink channel and the downlink channel to provide an adequate attenuation to the downlink frequency band 908. Additionally, system 900 can include a memory 920 that retains instructions for executing functions associated with electrical components 904-908. While shown as being external to memory 920, it is to be understood that one or more of electrical components 904-908 can exist within memory 920.

Figure 10:
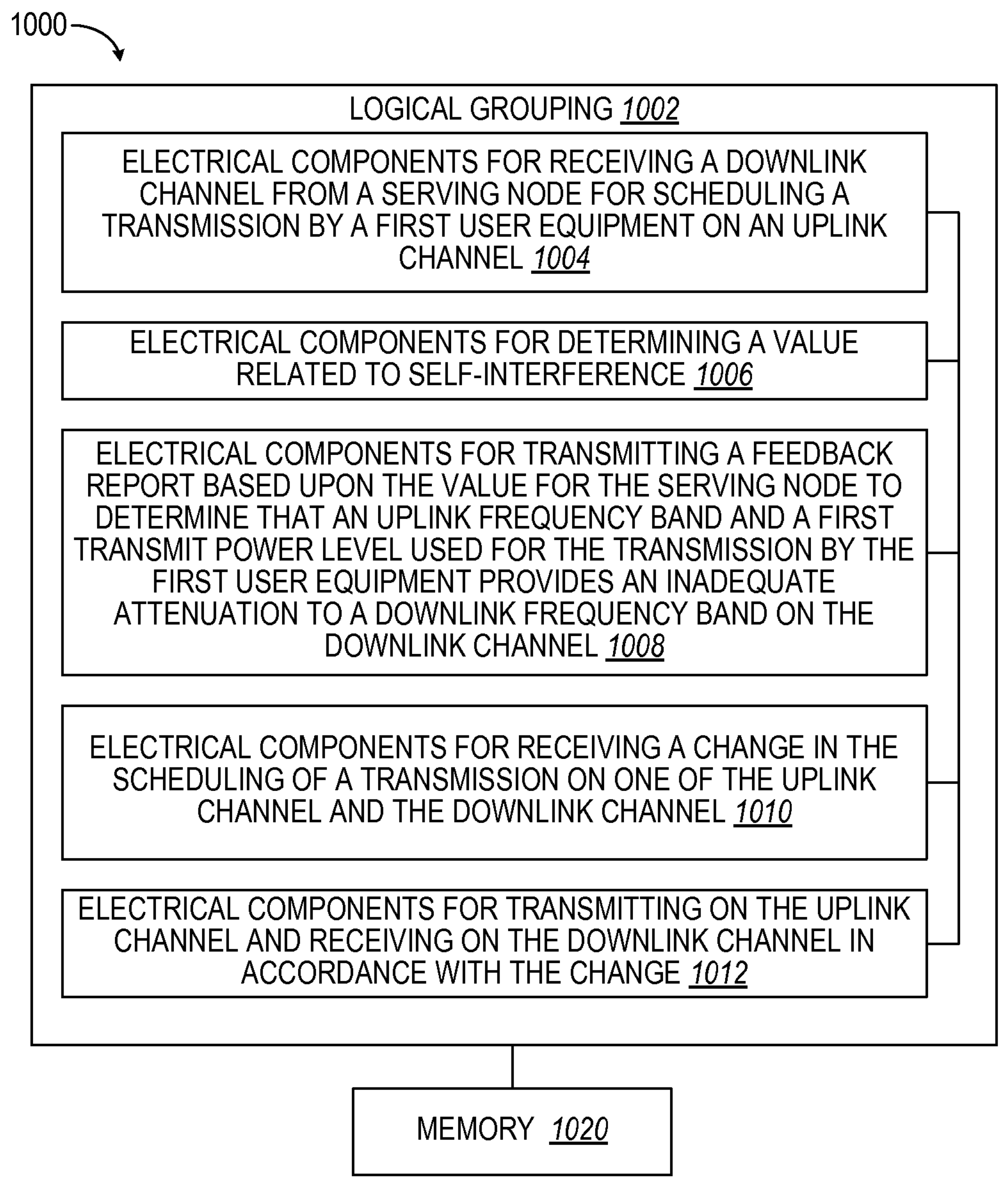
FIG. 10 illustrates a block diagram of a logical grouping of electrical components for mitigating inadequate attenuation that is incorporated at least in part in user equipment.

With reference to FIG. 10, illustrated is a system 1000 for mitigating inadequate attenuation for co-existence between channels. For example, system 1000 can reside at least partially within user equipment (UE). It is to be appreciated that system 1000 is represented as including functional blocks, which can be functional blocks that represent functions implemented by a computing platform, processor, software, or combination thereof (e.g., firmware). System 1000 includes a logical grouping 1002 of electrical components that can act in conjunction. For instance, logical grouping 1002 can include an electrical component for receiving a downlink channel from a serving node for scheduling a transmission by a first user equipment on an uplink channel 1004. Moreover, logical grouping 1002 can include an electrical component for determining a value related to self-interference 1006. For another instance, logical grouping 1002 can include an electrical component for transmitting a feedback report based upon the value for the serving node to determine that an uplink frequency band and a first transmit power level used for the transmission by the first user equipment provides an inadequate attenuation to a downlink frequency band on the downlink channel 1008. For an additional instance, logical grouping 1002 can include an electrical component for receiving a change in the scheduling of the transmission on one of the uplink channel and the downlink channel to provide an adequate attenuation to the downlink frequency band 1010. For an additional instance, logical grouping 1002 can include an electrical component for transmitting on the uplink channel and receiving on the downlink channel in accordance with the change 1012. Additionally, system 1000 can include a memory 1020 that retains instructions for executing functions associated with electrical components 1004-1012. While shown as being external to memory 1020, it is to be understood that one or more of electrical components 1004-1012 can exist within memory 1020.

Figure 11:
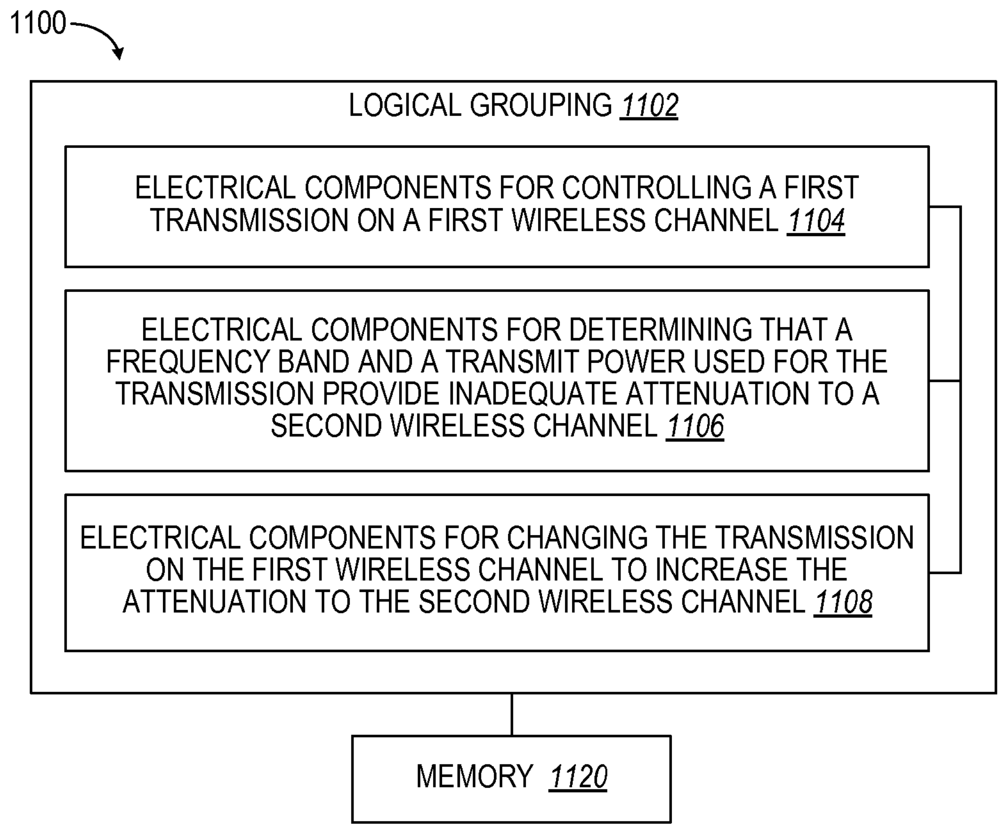
FIG. 11 illustrates a block diagram of a logical grouping of electrical components for mitigating inadequate attenuation.

With reference to FIG. 11, illustrated is a system 1100 for mitigating inadequate attenuation for co-existence between channels. For example, system 1100 can reside at least partially within a network entity (e.g., evolved NodeB). It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component for controlling a first transmission on a first wireless channel 1104. Moreover, logical grouping 1102 can include an electrical component for determining that a frequency band and a transmit power used for the transmission provide inadequate attenuation to a second wireless channel 1106. For another instance, logical grouping 1102 can include an electrical component for changing the transmission on the first wireless channel to increase the attenuation to the second wireless channel 1108. Additionally, system 1100 can include a memory 1120 that retains instructions for executing functions associated with electrical components 1104-1108. While shown as being external to memory 1120, it is to be understood that one or more of electrical components 1104-1108 can exist within memory 1120.

Figure 12:
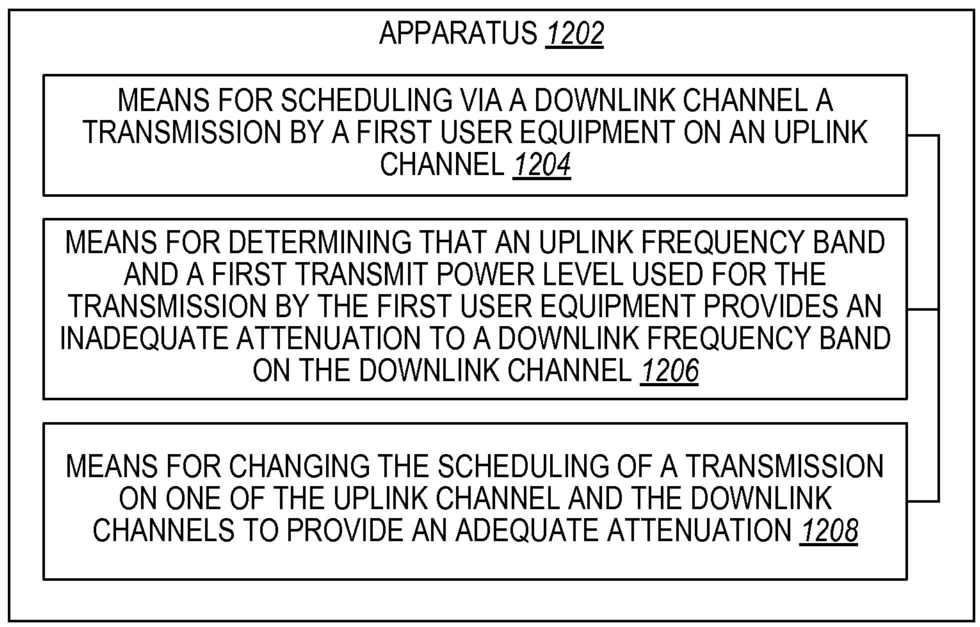
FIG. 12 illustrates a block diagram of an apparatus having means for a serving node to mitigate inadequate attenuation.

In FIG. 12, an apparatus 1202 is depicted for mitigating inadequate attenuation for co-existence between channels. Means 1204 are provided for scheduling via a downlink channel a transmission by a first user equipment on an uplink channel. Means 1206 are provided for determining that an uplink frequency band and a first transmit power level used for the transmission by the first user equipment provides an inadequate attenuation to a downlink frequency band on the downlink channel. Means 1208 are provided for changing the scheduling of the transmission on one of the uplink channel and the downlink channel to provide an adequate attenuation to the downlink frequency band.

In FIG. 13, an apparatus 1302 is depicted for mitigating inadequate attenuation for co-existence between channels. Means 1304 are provided for receiving a downlink channel from a serving node for scheduling a transmission by a first user equipment on an uplink channel. Means 1306 are provided for determining a value related to self-interference. Means 1308 are provided for transmitting a feedback report based upon the value for the serving node to determine that an uplink frequency band and a first transmit power level used for the transmission by the first user equipment provides an inadequate attenuation to a downlink frequency band on the downlink channel. Means 1310 are provided for receiving a change in the scheduling of the transmission on the uplink channel to provide an adequate attenuation to the downlink frequency band. Means 1312 are provided for transmitting on the uplink channel and receiving on the downlink channel in accordance with the change.

In FIG. 14, an apparatus 1402 is depicted for mitigating inadequate attenuation for co-existence between channels. Means 1404 are provided for controlling a first transmission on a first wireless channel. Means 1406 are provided for determining that a frequency band and a transmit power used for the transmission provide inadequate attenuation to a second wireless channel. Means 1408 are provided for changing the transmission on the first wireless channel to increase the attenuation to the second wireless channel.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms “component”, “module”, “system”, and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word “exemplary” is used herein to mean serving as an example, instance, or illustration. Any aspect or design described herein as “exemplary” is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term “article of manufacture” (or alternatively, “computer program product”) as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for mitigating inadequate attenuation for co-existence between channels, the method comprising:

scheduling via a downlink channel a transmission by a first user equipment on an uplink channel;

calculating an interference value based at least in part on a feedback report comprising reference values, the interference value being calculated by assessing a tolerated self-interference level based upon a total interference value minus thermal noise and minus a total interference from at least one base station indicated by the feedback report;

determining, based at least in part on the calculated interference value, that an uplink frequency band and a first transmit power level used for the transmission by the first user equipment provides inadequate attenuation to a downlink frequency band on the downlink channel; and changing the scheduling of a transmission on the uplink channel or the downlink channel to provide adequate attenuation.

2. The method of claim 1, in which inadequate attenuation comprises interference to a second user equipment.

3. The method of claim 1, in which inadequate attenuation comprises self desensitization of the first user equipment.

4. The method of claim 1, further comprising changing the scheduling of the transmission by assigning a second frequency band with adequate attenuation.

5. The method of claim 1, further comprising changing the scheduling of the transmission by reducing the first transmit power level to a second transmit power level.

6. The method of claim 1, further comprising:

receiving the feedback report.

7. The method of claim 1, in which:

the feedback report further comprises an uplink transmit power value; and the reference values are at least a downlink reference power and a downlink reference quality value.

8. The method of claim 1, in which:

the feedback report further comprises uplink power headroom information; and the reference values comprise reference signal received power (RSRP) information and reference signal received quality (RSRQ) information.

9. The method of claim 1, in which calculating the interference value further comprises determining at least one uplink allocation parameter for the first user equipment, in which self-interference is non-uniform across the uplink channel.

10. The method of claim 9, further comprising determining the at least one uplink allocation parameter selected from at least one of a start resource block, a number of resource blocks allocated to the first user equipment, or a power control value for the first user equipment.

11. The method of claim 1, further comprising estimating a portion of self-interference for the first user equipment by assessing a value for a typical power amplifier and a typical duplexer isolation.

12. A computer program product for mitigating inadequate attenuation for co-existence between channels, the computer program product being stored on a non-transitory computer-readable medium and comprising:

code to schedule via a downlink channel a transmission by a first user equipment on an uplink channel;

code to calculate an interference value based at least in part on a feedback report comprising reference values, the interference value being calculated by assessing a tolerated self-interference level based upon a total interference value minus thermal noise and minus a total interference from at least one base station indicated by the feedback report;

code to determine, based at least in part on the calculated interference value, that an uplink frequency band and a first transmit power level used for the transmission by the first user equipment provides inadequate attenuation to a downlink frequency band on the downlink channel; and code to change the scheduling of a transmission on the uplink channel or the downlink channel to provide adequate attenuation.

13. An apparatus for mitigating inadequate attenuation for co-existence between channels, the apparatus comprising:

means for scheduling via a downlink channel a transmission by a first user equipment on an uplink channel;

means for calculating an interference value based at least in part on a feedback report comprising reference values, the interference value being calculated by assessing a tolerated self-interference level based upon a total interference value minus thermal noise and minus a total interference from at least one base station indicated by the feedback report;

means for determining, based at least in part on the calculated interference value, that an uplink frequency band and a first transmit power level used for the transmission by the first user equipment provides inadequate attenuation to a downlink frequency band on the downlink channel; and means for changing the scheduling of a transmission on the uplink channel or the downlink channel to provide adequate attenuation.

14. An apparatus for mitigating inadequate attenuation for co-existence between channels, the apparatus comprising:

a transmitter;

a receiver;

a scheduler configured to schedule via the transmitter on a downlink channel a transmission by a first user equipment received by the receiver on an uplink channel; and at least one processor coupled to the memory, the at least one processor being configured:

to calculate an interference value based at least in part on a feedback report comprising reference values, the interference value being calculated by assessing a tolerated self-interference level based upon a total interference value minus thermal noise and minus a total interference from at least one base station indicated by the feedback report;

to determine, based at least in part on the calculated interference value, that an uplink frequency band and a first transmit power level used for the transmission by the first user equipment provides inadequate attenuation to a downlink frequency band on the downlink channel; and to change the scheduling of a transmission on the uplink channel or the downlink channel to provide adequate attenuation.

15. The apparatus of claim 14, in which inadequate attenuation comprises interference to a second user equipment.

16. The apparatus of claim 14, in which inadequate attenuation comprises self desensitization of the first user equipment.

17. The apparatus of claim 14, in which the at least one processor is further configured to change the scheduling of the transmission by assigning a second frequency band with adequate attenuation.

18. The apparatus of claim 14, in which the at least one processor is further configured to change the scheduling of the transmission by reducing the first transmit power level to a second transmit power level.

19. The apparatus of claim 14, in which the receiver is further configured to receive the feedback report.

20. The apparatus of claim 14, in which the feedback report further comprises an uplink transmit power value; and the reference values are at least a downlink reference power value and a downlink reference quality value.

21. The apparatus of claim 14, in which the feedback report further comprises uplink power headroom information; and the reference values comprise reference signal received power (RSRP) information and reference signal received quality (RSRQ) information.

22. The apparatus of claim 14, in which the at least one processor is further configured to calculate the interference value based upon at least one uplink allocation parameter for the first user equipment, in which self-interference is non-uniform across the uplink channel.

23. The apparatus of claim 22, in which the at least one uplink allocation parameter comprises at least one of a start resource block, a number of resource blocks allocated to the first user equipment, or a power control value for the first user equipment.

24. The apparatus of claim 14, in which the at least one processor is further configured to estimate a portion of self-interference for the first user equipment by assessing a value for a typical power amplifier and a typical duplexer isolation.

25. A method for mitigating inadequate attenuation for co-existence between channels, the method comprising:

receiving a downlink channel from a serving node for scheduling a transmission by a first user equipment on an uplink channel;

determining a value related to self-interference;

transmitting a feedback report based upon the value for the serving node to calculate an interference value based at least in part on the feedback report and to determine that an uplink frequency band and a first transmit power level used for the transmission by the first user equipment provides inadequate attenuation to a downlink frequency band on the downlink channel based at least in part on the calculated interference value, the interference value being calculated by assessing a tolerated self-interference level based upon a total interference value minus thermal noise and minus a total interference from at least one base station indicated by the feedback report;

receiving a change in the scheduling of a transmission on the uplink channel or the downlink channel; and transmitting on the uplink channel and receiving on the downlink channel in accordance with the change.

26. The method of claim 25, in which inadequate attenuation comprises self desensitization of the first user equipment.

27. The method of claim 25, further comprising transmitting on the uplink channel in accordance with the change by transmitting on a second frequency band with adequate attenuation.

28. The method of claim 25, further comprising transmitting on the uplink channel in accordance with the change by reducing transmit power.

29. The method of claim 25, in which the feedback report comprises at least one of a downlink reference power value, a downlink reference quality value, or an uplink transmit power value.

30. The method of claim 29, in which the feedback report comprises at least one of a reference signal received power information, a reference signal received quality information, or an uplink power headroom information.

31. A computer program product for mitigating inadequate attenuation for co-existence between channels, the computer program product being stored on a non-transitory computer-readable medium and comprising:

code to receive a downlink channel from a serving node for scheduling a transmission by a first user equipment on an uplink channel;

code to determine a value related to self-interference;

code to transmit a feedback report based upon the value for the serving node to calculate an interference value based at least in part on the feedback report and to determine that an uplink frequency band and a first transmit power level used for the transmission by the first user equipment provides inadequate attenuation to a downlink frequency band on the downlink channel based at least in part on the calculated interference value, the interference value being calculated by assessing a tolerated self-interference level based upon a total interference value minus thermal noise and minus a total interference from at least one base station indicated by the feedback report;

code to receive a change in the scheduling of a transmission on at least one of the uplink channel or the downlink channel; and code to transmit on the uplink channel and receiving on the downlink channel in accordance with the change.

32. An apparatus for mitigating inadequate attenuation for co-existence between channels, the apparatus comprising:

means for receiving a downlink channel from a serving node for scheduling a transmission by a first user equipment on an uplink channel;

means for determining a value related to self-interference;

means for transmitting a feedback report based upon the value for the serving node to calculate an interference value based at least in part on the feedback report and to determine that an uplink frequency band and a first transmit power level used for the transmission by the first user equipment provides inadequate attenuation to a downlink frequency band on the downlink channel based at least in part on the calculated interference value, the interference value being calculated by assessing a tolerated self-interference level based upon a total interference value minus thermal noise and minus a total interference from at least one base station indicated by the feedback report;

means for receiving a change in the scheduling of a transmission on at least one of the uplink channel or the downlink channel; and means for transmitting on the uplink channel and receiving on the downlink channel in accordance with the change.

33. An apparatus for mitigating inadequate attenuation for co-existence between channels, the apparatus comprising:

a receiver for receiving a downlink channel from a serving node for scheduling a transmission by a first user equipment on an uplink channel;

a computing platform for determining a value related to self-interference;

a transmitter for transmitting a feedback report based upon the value for the serving node to calculate an interference value based at least in part on the feedback report and determine that an uplink frequency band and a first transmit power level used for the transmission by the first user equipment provides inadequate attenuation to a downlink frequency band on the downlink channel based at least in part on the calculated interference value, the interference value being calculated by assessing a tolerated self-interference level based upon a total interference value minus thermal noise and minus a total interference from at least one base station indicated by the feedback report;

the receiver further for receiving a change in the scheduling of a transmission on at least one of the uplink channel or the downlink channel; and the transmitter further for transmitting on the uplink channel and the receiver further for receiving on the downlink channel in accordance with the change.

34. The apparatus of claim 33, in which inadequate attenuation comprises self desensitization of the first user equipment.

35. The apparatus of claim 33, in which the transmitter is further for transmitting on the uplink channel in accordance with the change by transmitting on a second frequency band with adequate attenuation.

36. The apparatus of claim 33, in which the transmitter is further for transmitting on the uplink channel in accordance with the change by reducing transmit power.

37. The apparatus of claim 33, in which the feedback report comprises at least one of a downlink reference power value, a downlink reference quality value, or an uplink transmit power value.

38. The apparatus of claim 37, in which the feedback report comprises at least one of a reference signal received power information, a reference signal received quality information, or an uplink power headroom information.

39. A method for mitigating inadequate attenuation for co-existence between channels, the method comprising:

controlling a transmission on a first wireless channel;

calculating an interference value based at least in part on a feedback report comprising reference values, the interference value being calculated by assessing a tolerated self-interference level based upon a total interference value minus thermal noise and minus a total interference from at least one base station indicated by the feedback report;

determining, based at least in part on the calculated interference value, that a frequency band and a transmit power used for the transmission provide inadequate attenuation to a second wireless channel; and changing the transmission on the first wireless channel to increase attenuation to the second wireless channel.

40. The method of claim 39, further comprising controlling the transmission on the first wireless channel by scheduling user equipment.

41. The method of claim 39, further comprising controlling the transmission on the first wireless channel by receiving a grant from a serving node and using resources on the first wireless channel given by the grant.

42. The method of claim 39, further comprising receiving the feedback report.

43. The method of claim 39, further comprising controlling the transmission on the first wireless channel comprising an uplink channel.

44. The method of claim 39, further comprising controlling the transmission on the first wireless channel comprising a downlink channel.

45. The method of claim 39, further comprising changing the transmission on the first wireless channel transmitted by a first user equipment to increase attenuation to the second wireless channel received by the first user equipment.

46. The method of claim 39, further comprising changing the transmission on the first wireless channel transmitted by a first user equipment to increase attenuation to the second wireless channel received by a second user equipment.

47. A computer program product for mitigating inadequate attenuation for co-existence between channels, the computer program product being stored on a non-transitory computer-readable medium and comprising:

code to control a transmission on a first wireless channel;

code to calculate an interference value based at least in part on a feedback report comprising reference values, the interference value being calculated by assessing a tolerated self-interference level based upon a total interference value minus thermal noise and minus a total interference from at least one base station indicated by the feedback report;

code to determine, based at least in part on the calculated interference value, that a frequency band and a transmit power used for the transmission provide attenuation that is inadequate to a second wireless channel; and code to change the transmission on the first wireless channel to increase attenuation to the second wireless channel.

48. An apparatus for mitigating inadequate attenuation for co-existence between channels, the apparatus comprising:

means for controlling a transmission on a first wireless channel;

means for calculating an interference value based at least in part on a feedback report comprising reference values, the interference value being calculated by assessing a tolerated self-interference level based upon a total interference value minus thermal noise and minus a total interference from at least one base station indicated by the feedback report;

means for determining, based at least in part on the calculated interference value, that a frequency band and a transmit power used for the transmission provide attenuation that is inadequate to a second wireless channel; and means for changing the transmission on the first wireless channel to increase attenuation to the second wireless channel.

49. An apparatus for mitigating inadequate attenuation for coexistence between channels, the apparatus comprising:

a transmitter for controlling a transmission on a first wireless channel;

at least one processor coupled to the memory, the at least one processor being configured:

to calculate an interference value based at least in part on a feedback report comprising reference values, the interference value being calculated by assessing a tolerated self-interference level based upon a total interference value minus thermal noise and minus a total interference from at least one base station indicated by the feedback report;

to determine, based at least in part on the calculated interference value, that a frequency band and a transmit power used for the transmission provide attenuation that is inadequate to a second wireless channel; and the transmitter being further configured to change the transmission on the first wireless channel to increase attenuation to the second wireless channel.

50. The apparatus of claim 49, further comprising a scheduler for controlling the transmission on the first wireless channel by scheduling user equipment.

51. The apparatus of claim 49, further comprising a receiver for receiving a grant from a serving node and in which the transmitter is further for controlling the transmission on the first wireless channel by using resources on the first wireless channel given by the grant.

52. The apparatus of claim 49, in which the at least one processor is further configured to receive the feedback report.

53. The apparatus of claim 49, in which the at least one processor is further configured to control the transmission on the first wireless channel comprising an uplink channel.

54. The apparatus of claim 49, in which the at least one processor is further configured to control the transmission on the first wireless channel comprising a downlink channel.

55. The apparatus of claim 49, in which the transmitter is further for changing the transmission on the first wireless channel transmitted by a first user equipment to increase attenuation to the second wireless channel received by the first user equipment.

56. The apparatus of claim 49, in which the transmitter is further for changing the transmission on the first wireless channel transmitted by a first user equipment to increase attenuation to the second wireless channel received by a second user equipment.

* * * * *